March 5, 1940.  E. J. HARBISON  2,192,471
METHOD OF MAKING PIPE FITTINGS
Filed June 17, 1937

INVENTOR.
Earl J. Harbison
BY Mock & Blum
ATTORNEYS

Patented Mar. 5, 1940

2,192,471

UNITED STATES PATENT OFFICE 2,192,471

METHOD OF MAKING PIPE FITTINGS

Earl J. Harbison, Schenectady, N. Y.

Application June 17, 1937, Serial No. 148,644

1 Claim. (Cl. 29—157)

My invention relates to a new and improved pipe fitting and a new and improved method of making the same.

One of the objects of my invention is to provide a simple and accurate method of making a pipe fitting without the use of a forging operation.

Another object of the invention is to provide a method which will greatly lower the cost of manufacture of forged pipe fittings, by substituting simple stamping, welding and cutting operations for the present method of making the well-known forged and seamless pipe fittings.

Other objects of my invention will be set forth in the following description and drawing which illustrate preferred embodiments thereof, it being understood that the above statement of the objects of my invention is intended generally to explain the same without limiting it in any manner.

It has been well known for many years to manufacture pipe fittings of various curved and angular shapes, for connecting pipe lines to each other. These pipe fittings have been made by an expensive forging process and they have been sold at a very high price.

According to the method specified herein, I produce an accurate and satisfactory article, at a much lower manufacturing cost.

Figure 1:
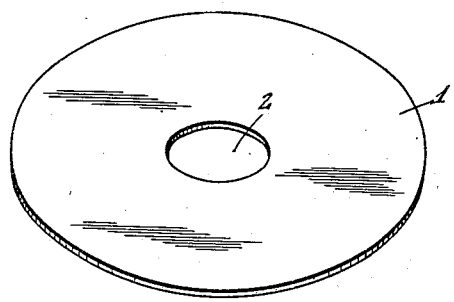
Fig. 1 is a perspective view showing a metal blank which is used for making the improved fitting.

Fig. 1 shows a flat or planar metal disc 1, having a central opening 2, which can be used for making the improved fitting.

Figure 2:
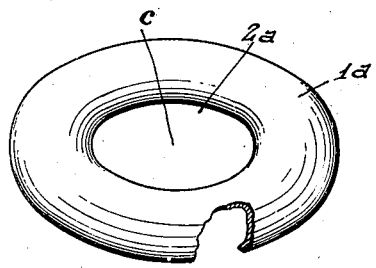
Fig. 2 is a perspective view illustrating the first step in the improved method.

As shown in Fig. 2, the blank 1 is shaped by any suitable die-stamping or spinning method or other suitable method, so as to form a second blank 1a, having an opening 2a which may be larger than the opening 2. These blanks 1a may be made directly by cutting and stamping sheet metal. The blank 1a may be a casting, and it may be made directly, or in a series of steps, in any suitable manner. In Fig. 2 a part of the representation of the blank 1a has been broken away, in order to show that said blank 1a has a semi-circular cross section in a radial plane, taken with reference to the central point C of the central opening 2a.

Figure 3:
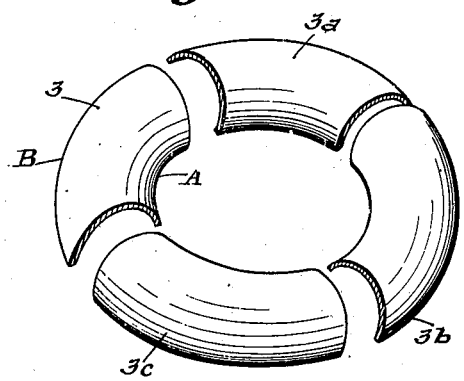
Fig. 3 is a perspective view illustrating the second step in the improved method.

As shown in Fig. 3, the blank 1a can be cut into any desired number of segments. In Fig. 3, I have shown four 90° segments 3, 3a, 3b, and 3c. Each of these segments has a semi-circular cross section along each radial plane, and each of these segments is quadrantal, in plan view.

In plan view, the sides A and B of each said segment are arcs of circles, the side A having a shorter radius than the side B.

Figure 4:
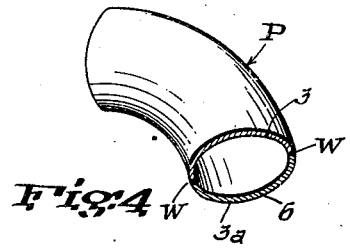
Fig. 4 is a perspective view showing a completed pipe fitting.

As shown in Fig. 4, two of the segments 3 and 3c, can be assembled by means of welding along the joinder lines W, so as to make a complete curved pipe fitting, which is a 90° fitting, in this embodiment. The welding device which is used for connecting a pair of segments to each other may be of the type which deposits molten metal.

Welding devices of this type are well known and their mode of operation requires no distinction.

I can use any suitable means for connecting a pair of segments to each other so as to form a pipe fitting.

Figure 5:
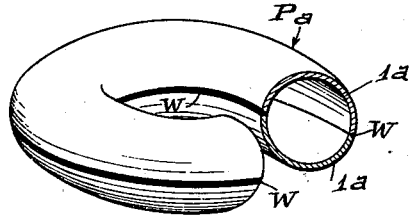
Fig. 5 is a perspective view showing another type of pipe fitting.

Fig. 5 shows a pipe fitting Pa of modified form, and having an angle of 270°. The form of the fitting can thus be varied, as desired.

Figure 6:
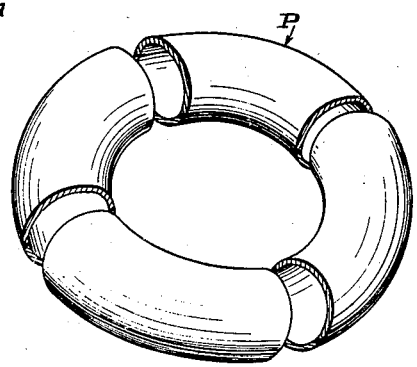
Fig. 6 illustrates how two blanks of the kind shown in Fig. 2 or in Fig. 3, can be assembled so as to make four pipe fittings of the type shown in Fig. 4.

Fig. 6 shows how two blanks of the type shown in Fig. 2, can be cut so as to provide eight segments of the type shown in Fig. 3, and Fig. 6 also shows how these eight segments can be assembled so as to form four pipe fittings of the type shown in Fig. 4.

One of the advantages of the improved method is that two complete blanks 1a can be assembled by means of welding or the like, and the assembled blanks 1a can then be cut so as to provide pipe fittings, of the type shown in Fig. 4 and in Fig. 6.

It is preferable first to assemble a pair of blanks 1a, and then to cut the pair of assembled blanks into pipe fittings of the desired size and shape. However, I do not exclude from the invention the method whereby a channel-shaped circular blank of the type shown in Fig. 2, is cut into two or more matched pieces, and these matched pieces are assembled with each other in pairs or with corresponding pieces cut from another similar blank. The blanks 1a may be shaped so that more than two matched pieces may be connected at their longitudinal edges, to form a pipe fitting having a closed cross section.

However, connecting a pair of complete blanks 1a to each other, prior to cutting them along radial lines, provides greater manufacturing economy because it is easy to assemble a pair of blanks 1a by means of clamping devices which engage only the outer end faces of said blanks, and turn the assembled blanks about an axis which passes through the central point C, while applying the molten metal welding material continuously to the contacting edges of the two blanks, so as continuously to connect the edges of the blanks.

Any desired number of pairs of assembled blanks can thus be turned around a common axis, utilizing suitable clamps for this purpose, while the welding material is applied so as to connect the pairs of blanks to each other.

In order to get a satisfactory fitting for connecting two pipes or two pipe lines, it is highly desirable to have each of the edge surfaces of the fitting truly located in a plane. It has heretofore been proposed to make a member of the general type shown in Fig. 4, but said member was not accurately manufactured or satisfactory, unless it was made by a forging process.

By using segments which are cut from the semi-circular and channel-shaped blank, it is possible to secure accurate matching because the segments are made from the same dies. Likewise a very precise and superior article is made by first connecting two blanks of the type of the blank 1a to each other by welding or in any other manner, and then cutting the connected blanks along radial lines. A liquid-tight and air-tight fitting can thus be secured.

The edge surfaces 6 of the completed fittings P are then truly circular or annular and each said edge surface is located truly in a plane.

Likewise, when it is attempted to stamp individual segments, and then assemble the individual segments, said segments are more or less distorted as a result of the stamping, so that when two segments are connected to each other, the article is not accurately made.

By stamping a one-piece annular blank having a semi-circular cross section, and then cutting said blank 1a into segments, this distortion is eliminated or equalized, so that when segments of the same blank are connected, an accurate fitting is secured. The invention is not limited to connecting segments cut from the same blank, because if the blanks 1a are made accurately, like segments from different blanks may be connected. If two blanks of the type shown in Fig. 2 are welded at their edges by depositing molten metal at said edges, the relatively thin die-stamped metal blanks are additionally protected against distortion, when normal cutting pressure is applied. A blank of the type shown in Fig. 2 may be distorted somewhat under normal cutting action, if said blank is made of thin metal. Likewise, if two segments of the type shown in Fig. 3 are connected by depositing molten metal at their meeting edges, it is possible for the metal to flow over the end faces of said segments. This is eliminated by making a blank according to Fig. 5. In such case, the lines of cut sever the previously deposited and solidified welding metal.

While I prefer to have the radial cross section of the blank 1a semi-circular, I can form the blank 1a with any other desired cross-section, which may be designated generally as concavo-convex.

The linear elements of said cross-section may be curved, as in the specific embodiment shown, or said linear elements may be straight lines which are inclined to each other, and the invention is not limited to any particular shape of the blank 1a in cross section, as long as segments cut from one such blank, or from a plurality of such blanks, can be connected so as to form a pipe fitting.

Generally speaking, the method includes cutting an annular blank having a concavo-convex cross section into two or more segments, and connecting pairs of corresponding segments to each other at their edges.

Whenever I refer to cutting segments from the blank 1a, I do not wish to be limited to the use of segments which are cut directly from the blank 1a without any finishing operation, as said segments may be trimmed or cut additionally after they have been formed by cutting the blank 1a.

However, it is one of the advantages of the improved method that it is possible to eliminate trimming operations.

The article which is made by connecting two blanks 1a to each other by welding or the like, may be designated as a sleeve-like annulus. It may have any desired shape, polygonal or otherwise, in plan view, and said shapes are included in the term "annular" for the purposes of the invention. Likewise, when the blanks 1a are made, they can have flanges or other supplemental parts, which can be trimmed off the connected pairs of blanks. For some purposes said flanges or supplemental parts may remain on the pipe fittings.

I have shown preferred embodiments of my invention, but it is clear that numerous changes and omissions can be made without departing from its spirit.

I claim:

A method of forming a pipe fitting which consists in permanently connecting the edge portions of two like blanks of annular shape, each said blank having an inner wall and an outer wall which are respectively concave and convex in radial cross-section, by depositing molten metal at the meeting edges of said blanks to form a closed sleeve-like annulus whose inner walls and outer walls are closed curves in radial cross-section, and then cutting said annulus transversely in a plurality of planes to make a pipe fitting having planar edge-walls whose inner and outer surfaces are closed curves.

EARL J. HARBISON.